March 12, 1957 P. J. HOHNSTEIN 2,784,558
GATE OR VALVE FOR AN IRRIGATION PIPE LINE
Filed May 31, 1956
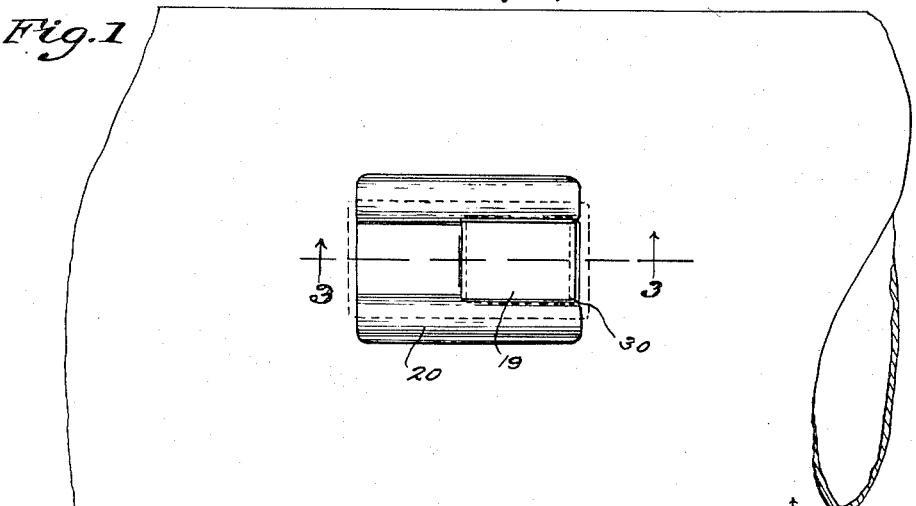
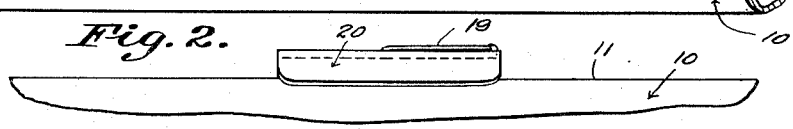
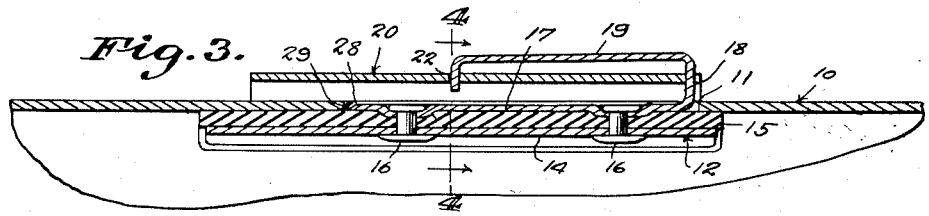
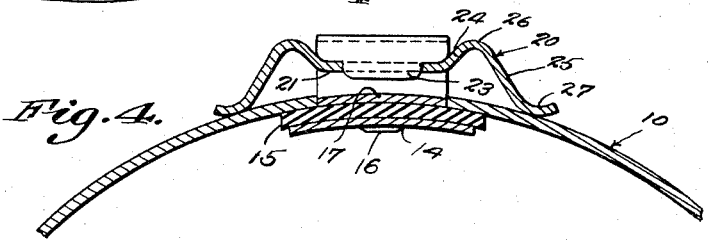
Paul J. Hohnstein
INVENTOR
BY *CA Snow & Co.*
ATTORNEYS.

United States Patent Office 2,784,558
Patented Mar. 12, 1957

2,784,558

GATE OR VALVE FOR AN IRRIGATION PIPE LINE

Paul J. Hohnstein, Hastings, Nebr.

Application May 31, 1956, Serial No. 588,543

2 Claims. (Cl. 61—28)

This invention relates to an improved gate or valve for an irrigation pipe line.

An object of this invention is to provide an improved gate or valve which is slidably mounted on an irrigation pipe and which can be readily moved to either open or closed position.

Another object of this invention is to provide an improved gate valve or an irrigation pipe line which can be mounted on the pipe from the outside so that an opening may be formed in the pipe at any desired location and the gate valve inserted in the opening without the use of tools.

A further object of this invention is to provide an improved gate valve which is of simple construction and can be readily replaced in the event of leakage or the like.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is a fragmentary plan view of an irrigation pipe having a gate valve according to an embodiment of this invention, mounted thereon.

Fig. 2 is a fragmentary side elevation of the pipe and valve.

Fig. 3 is a longitudinal section taken on line 3—3 of Fig. 1.

Fig. 4 is a transverse section taken substantially on line 4—4 of Fig. 3.

Referring to the drawing, the numeral 10 designates generally an elongated irrigation pipe. The pipe 10 is formed at a selected point with an elongated liquid delivery opening 11. The opening 11 is elongated and is preferably rectangular in plan.

In order to provide a means whereby the opening 11 may be selectively opened or closed, I have provided a manually adjustable spring tensioned valve, generally indicated at 12. The valve 12 includes an inner transversely curved plate 14 against the outer side of which a yieldable plug 15 is secured by means of headed rivets or securing members 16. These securing members 16 also extend through an elongated plate 17 which is of a length substantially equal to the length of the opening 11 so that in the closed position of the valve member 12 the plate 17 will be disposed within the opening 11. The plate 17 includes an upwardly projecting extension 18 at one end thereof and a parallel arm 19 extends from the extension 18 and projects over the plate 17. A resilient plate 20 is engaged over the outer side of the pipe 10 and comprises an inner body 21 formed with an opening 22 through which a downwardly extending tongue 23 carried by the plate or arm 19 is adapted to engage. The plate 21 is formed along opposite longitudinal edges thereof with upwardly and outwardly projecting or diverging extensions 24 which merge with downwardly diverging extensions 25. The connection between the extensions 24 and 25 is formed by a transversely curved connecting member 26. The extensions 25 form resilient elongated arms and the lower outer ends of the extensions or arms 25 terminate in upwardly curved slide members 27 engageable with the outer side of the pipe 10. The forward end of the plate 17 is formed on a bevel indicated at 28 and the adjacent end of the opening 11 is also formed on a downwardly and inwardly inclined bevel 29. When the valve structure 12 is moved to an open position the bevel 28 will engage the bevel 29 so as to thereby move plate 17 downwardly and inwardly to bear against the inner side of the pipe 10. The plate 17 may be moved to the left as viewed in Fig. 3 to the limit provided by the outwardly projecting extension 18. At this time substantially all of the openings 11 will be uncovered so that water or other liquid may freely flow through the opening 11. As shown in Fig. 4, the plate 17 is transversely curved, being curved on the radius of the pipe 10 so that the outer convex side of the plate 17 will snugly engage against the inner concave side of the pipe 10, when the valve structure is moved longitudinally to an open position.

The spring member 20 is adapted to normally hold the valve structure 12 and the gasket or plug 15 in closed position with plate 17 disposed entirely within the opening 11. When the valve is to be moved to an open position the valve is moved longitudinally of pipe 10 to the left as viewed in Fig. 3. This movement may be accomplished by pressing an implement or tool against the extension 18. The valve 12 is then moved to the left to the limit permitted by the extension 18 which in the completely open position of the valve will bear against the beveled end 29 of opening 11.

This valve structure may be easily and quickly mounted in the pipe 10 at any point along the length of the pipe and can be inserted within the pipe from the exterior due to the rectangular shape of the opening 11, which will thereby permit insertion of the valve structure. During the insertion of the valve including the gasket and the inner plate 14 the spring 20 will be removed so that the gasket 15 with plate 14 and plate 17 may be slipped into the opening 11. This insertion is accomplished by extending the gasket 15 and plates 14 and 17 crosswise of the opening 11 and then turning the structure so as to be disposed lengthwise of the pipe 10. The spring 20 may then be slipped between the arm 19 and the pipe 10 until the tongue 23 slips into the slot 22 of spring 20. The spring 20 is also provided with a notch 30 at one end thereof in which the projection 18 snugly engages so that the spring will at all times be disposed parallel with the longitudinal axis of the pipe 10 and the longitudinal axis of gasket 15 and plate 14.

The gate or valve structure hereinbefore described, can be moved to a completely open or closed position or can be moved to a partly open position, as may be desired. Furthermore, the gate or valve structure can be inserted or removed without the use of any tools, once the opening has been formed in the irrigation pipe.

What is claimed is:

1. In an irrigation pipe having a rectangular outlet port, a movable closure for said port comprising an elongated plate arcuate in transverse section and having a length and width greater than said port, a gasket fixed to the outer convex side of said plate, a second transversely arcuate plate fixed to the outer side of said gasket and having a length and width substantially equal to the length and width of said port, a right angle projection extending from one end of said second plate, a resilient arm extending from said projection and disposed substantially parallel with said second plate, a dished spring member projecting partly beneath said arm and formed with a transverse slot, and a tongue carried by said arm engaging in said slot whereby said spring member will move with said arm.

2. In an irrigation pipe having a rectangular outlet port, a movable closure for said port comprising an elongated plate arcuate in transverse section, and having a length and width greater than said port, a gasket fixed to the outer convex side of said plate, a second transversely arcuate plate fixed to the outer side of said gasket and having a length and width substantially equal to the length and width of said port, a right angle projection extending from one end of said second plate, a resilient arm extending from said projection and disposed substantially parallel with said second plate, a dished spring member projecting partly beneath said arm and formed with a transverse slot, one end of said port being beveled inwardly and the adjacent end of said second plate being formed with a complementary bevel, and a tongue carried by said arm engaging in said slot whereby said spring member will move said arm.

References Cited in the file of this patent

UNITED STATES PATENTS

| | | |
|---|---|---|
| Re. 14,081 | Linxweiler | Mar. 7, 1916 |
| 952,658 | Worley | Mar. 22, 1910 |
| 2,062,779 | Congable | Dec. 1, 1936 |
| 2,499,738 | Folsom | Mar. 7, 1950 |